United States Patent [19]

Takahashi

[11] Patent Number: 5,127,084
[45] Date of Patent: Jun. 30, 1992

[54] VARIABLE LIGHT ATTENUATOR OF MULTIPLE-FIBER RIBBONS

[75] Inventor: Mitsuo Takahashi, Matsudo, Japan

[73] Assignee: Seikoh Giken Co., Ltd., Matsudo, Japan

[21] Appl. No.: 680,118

[22] Filed: Apr. 3, 1991

[30] Foreign Application Priority Data

Oct. 30, 1990 [JP] Japan .................................. 2-293179

[51] Int. Cl.$^5$ .............................................. G02B 6/40
[52] U.S. Cl. .................................... 385/140; 385/114
[58] Field of Search ............... 350/96.22, 96.20, 96.15; 385/53, 54, 140, 59, 71, 114

[56] References Cited

U.S. PATENT DOCUMENTS

| | | | |
|---|---|---|---|
| 4,987,946 | 2/1991 | Williams et al. | 350/96.22 X |
| 5,024,505 | 6/1991 | Junji et al. | 350/96.22 |
| 5,035,482 | 7/1991 | Berge et al. | 350/96.22 X |
| 5,066,094 | 11/1991 | Takahashi | 385/140 |

Primary Examiner—John D. Lee
Assistant Examiner—Phan T. Heartney
Attorney, Agent, or Firm—Spencer, Frank & Schneider

[57] ABSTRACT

A variable light attenuator for use with multiple-fiber ribbons consisting of optical fiber elements. The attenuator consists of movable and fixed ferrule assemblies, each of which is fabricated by inserting a plurality of optical fiber elements arranged in line with equal pitch into a plurality of through holes arranged in line with equal pitch in a block of the substrate, and by polishing the end of the substrate together with the ends of the plurality of optical fiber elements so that the ends are finished to be eight degrees or more inclined with respect to a plane perpendicular to the optical axis of the movable and fixed ferrule assemblies. The movable ferrule assembly is shifted toward the sidewall of the substrate in a direction perpendicular to the optical axis of the optical fiber elements by means of a micrometer spindle or by means of a screw rod connected to a miniature motor so that the optical power passing through the optical fiber elements is concurrenlty attenuated or cut by changing the common area shared by the optical fiber elements of the movable and fixed ferrule assemblies on the substrate.

12 Claims, 4 Drawing Sheets

VARIABLE LIGHT ATTENUATOR OF MULTIPLE-FIBER RIBBONS

BACKGROUND OF THE INVENTION

The present invention relates to a variable light attenuator for use with optical fibers, and more particularly to a variable light attenuator for use with a multiple-fiber ribbon wherein the optical power to be supplied to the multiple-fiber ribbon, consisting of a plurality of optical fibers arranged in parallel, can continuously be controlled.

FIG. 5 shows a conventional variable light attenuator for attenuating the light power transmitted through an optical fiber.

Rod lenses 44 and 45 are provided at the ends of optical fibers 41 and 42, respectively. A thin glass plate 43 is arranged in a space between rod lenses 44 and 45.

Glass plate 43 has an evaporated thin film made of a metal or the same type of material on one side thereof where the transparency continuously changes with distance in the vertical direction. The transparency can be changed if glass plate 43 is forcibly moved toward the arrows shown in the figure.

FIG. 6 is a cross-sectional view of another example of a conventional variable light attenuator.

Ferrules 48 and 49 are attached to first and second optical fibers 46 and 47 so that the ferrules 48 and 49 which face each other are inserted together into an alignment sleeve 50. The optical power passing through the variable light attenuator can be changed by changing distance S from the end of ferrule 48 to the end of ferrule 49.

As distance S increases, the light power from optical fiber 46 is scattered, and the light power at the end of optical fiber 47 decreases.

FIG. 7 shows the structure of a single-mode multiple-fiber ribbon consisting of a plurality of optical fibers.

Optical fiber element 51 is covered with a protective coating 52 to form an optical fiber element.

A multiple-fiber ribbon consists of four to 12 optical fiber elements arranged in a line.

The optical fiber element has an outer diameter of 0.125 mm, and four to 12 optical fiber elements are generally arranged with a pitch of 0.25 mm.

A variable light attenuator for use with a multiple-fiber ribbon consisting of a plurality of optical fibers is being developed. However, the structure of FIG. 5 or FIG. 6 cannot be employed.

The end of a first optical fiber is separated from the end of a second optical fiber in the conventional variable light attenuator. If the light power from a plurality of optical fibers arranged in a line with 0.25 mm spacings is input to a variable light attenuator whose optical paths are arranged in line with 0.25 mm spacings, the optical signals from different optical fiber elements interfere with each other in the space where attenuation occurs. An optical signal in an optical fiber is partly transmitted to the adjacent optical fiber in the other line after passing through a variable light attenuator of this type, causing crosstalk in the adjacent optical fiber.

FIG. 8 shows the structure of an example of an optical switch for a multiple-fiber ribbon comprising optical fibers originally presented by the inventor of the present invention, and which is not prior art.

Either circuit "B" or "C" is selected by a solenoid of the switch shown in FIG. 8.

Ferrule assemblies 53 through 55 are provided to connect multiple-fiber ribbon "A" to multiple-fiber ribbon "B" or "C". Ferrule assemblies 54 and 55 are fastened to a substrate (not shown) so that ferrules 54 and 55 are arranged in parallel, so that ferrule assembly 53 is arranged to face toward ferrule 54 or 55.

A first electromagnetic actuator consisting of a movable iron core 56 and solenoid coil 57 is provided on one side of ferrule assembly 53. A second electromagnetic actuator consisting of a movable iron core 58 and solenoid coil 59 is provided on the other side of ferrule assembly 53.

Movable iron cores 56 and 58 alternately strike ferrule assembly 53 when a current flows through solenoid coils 57 and 59 alternately. When movable iron core 56 strikes ferrule assembly 53, ferrule assembly 53 goes to the position of ferrule assembly 55 immediately. When movable iron core 58 strikes ferrule assembly 53, ferrule assembly 53 goes to the position of ferrule assembly 54 immediately. When ferrule assembly 53 is set at the position of ferrule assembly 55, circuit "A" is connected to circuit "C". When ferrule assembly 53 is set at the position of ferrule assembly 54, circuit "A" is connected to circuit "B".

A DC current always flows through one of solenoid coils 57 and 59 during operation, and a temperature rise within each solenoid coil expands the respective parts therein. This expansion reduces the long-term stability and reliability of the attenuator.

The objective of the present invention is to present a variable light attenuator for use with a multiple-fiber ribbon consisting of a plurality of optical fibers arranged in a line which is, with long-term stability and reliability, used to continuously attenuate optical power to an appropriate amount in the 0 to 100% range and used to cut off the optical power as an optical switch.

SUMMARY OF THE INVENTION

A variable light attenuator for use with multiple-fiber ribbons consisting of optical fiber elements, which is built in accordance with the present invention, consists of fixed and movable ferrule assemblies. Each ferrule assembly is fabricated by inserting a plurality of optical fiber elements constituting one or more multiple-fiber ribbons. In each ribbon the plurality of optical fiber elements are arranged in line with equal pitch, and are inserted into a plurality of through holes, also arranged in line with equal pitch in a rectangular block on a substrate. The end of the substrate, together with the ends of the plurality of optical fiber elements which appear in the end of the block on the substrate passing through the plurality of through holes, are then polished.

The fixed ferrule assembly is fastened to the bottom of the substrate whose cross-section is of U-shape relative to a plane which includes a line running along the plurality of optical fiber elements constituting a multiple-fiber ribbon.

The movable ferrule assembly is installed in the substrate so that the ends of the plurality of optical fiber elements which pass through the plurality of through holes therein face the ends of the plurality of optical fiber elements installed in the fixed ferrule assembly.

The variable light attenuator of this type is characterized in that the movable ferrule assembly can continuously be shifted along the ends of the optical fiber elements of the fixed ferrule assembly by the use of sliding means installed in a sidewall of the substrate so that the common area shared by the optical fiber elements of the movable and fixed ferrule assemblies can be set at an arbitrary value where the optical power attenuation is in the range of 0% to 100% when the movable ferrule assembly runs on the plane of installation at the bottom of the substrate.

The sliding means is, in a first embodiment of the present invention, a micrometer spindle which causes the movable ferrule assembly to shift toward the sidewall in the other side of the substrate while a coil spring in the sidewall pushes the movable ferrule assembly toward the sidewall in this side of the substrate. In this embodiment, the common area shared by the optical fiber elements of the movable and fixed ferrule assemblies is set at a maximum which corresponds to 100% of the optical power which can pass through the movable and fixed ferrule assemblies unless the micrometer spindle is extruded from the sidewall in this side of the substrate. The common area can arbitrarily be reduced continuously from 100% to 0%.

The sliding means is, in a second embodiment, an adjusting means, connected to a screw rod driven by a miniature motor installed in the sidewall of one side of the substrate, which causes the movable ferrule assembly to shift toward the sidewall in the other side of the substrate while a coil spring in the sidewall pushes the movable ferrule assembly toward the sidewall in the one side of the substrate. In this embodiment, the common area shared by the optical fiber elements of the movable and fixed ferrule assemblies is set at a maximum which corresponds to full optical power which can pass through the movable and fixed ferrule assemblies unless the screw rod is extruded from the sidewall in this side of the substrate. The common area is not provided when the optical power passing through the movable and fixed ferrule assemblies is cut while the screw rod is extruded out of the sidewall with the miniature motor.

In both embodiments, the ends of the optical fiber elements installed in each of the movable and fixed ferrule assemblies are finished so as to be eight degrees or more with respect to a plane perpendicular to the optical axis of the movable and fixed ferrule assemblies.

In order to fabricate the through hole used in the present invention, inventions described in the present inventor's U.S. patent application Ser. No. 07/534,263 filed on Jun. 7, 1990, now U.S. Pat. No. 5,050,950, co-pending applications Ser. No. 07/542,075 filed Jun. 22, 1990 and Ser. No. 07/647,504 filed Jan. 29, 1991 may be used.

DESCRIPTION OF THE PREFERRED EMBODIMENTS

Figure 1A:
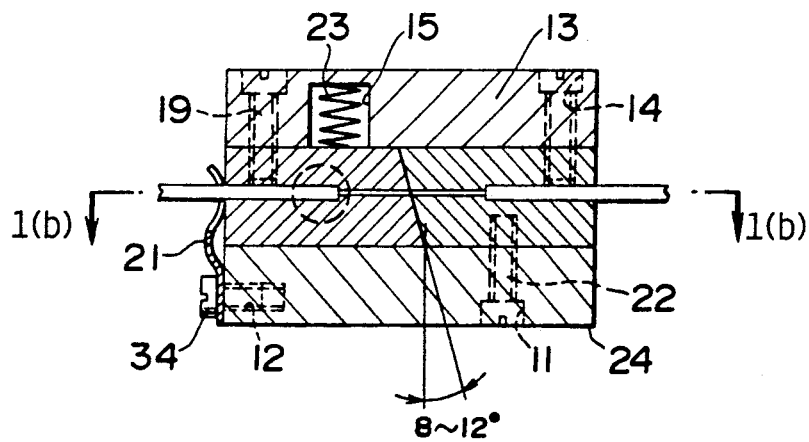
FIG. 1(a) is a sectional front elevation view.

The present invention will be explained in detail hereafter referring to the drawings.

Figure 1B:
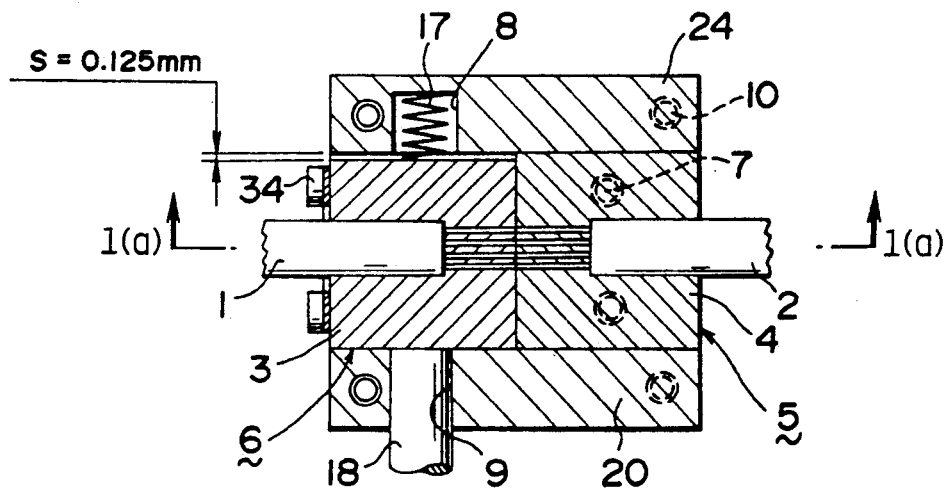
FIG. 1(b) is a sectional top plan view and FIG. 1(c) is a side elevation view of a first embodiment of a variable light attenuator for use with a multiple-fiber ribbon consisting of optical fiber elements according to the present invention.
Figure 1C:
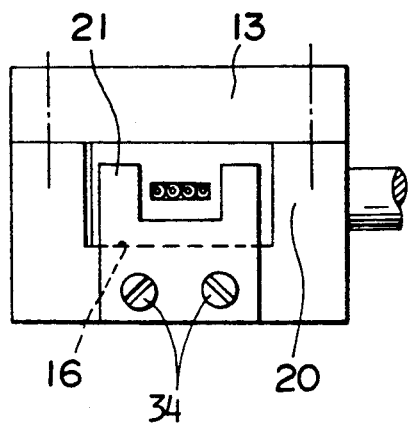

FIG. 1(a) shows a sectional front elevation view of a first embodiment of the variable light attenuator for use with a multiple-fiber ribbon consisting of a plurality of optical fiber elements, which is built in accordance with the present invention. FIG. 1(b) is a sectional top plan view and FIG. 1(c) is a side elevation view of the variable light attenuator shown in FIG. 1(a).

Movable ferrule assembly 6 consists of multiple-fiber ribbon 1 having optical fiber elements attached to a ferrule 3. Fixed ferrule assembly 5 consists of multiple-fiber ribbon 2 of optical fiber elements attached to a ferrule 4.

Ferrule 3 provides a hollow space which stores covers of multiple-fiber ribbon 1 having optical fiber elements, and through holes whose number corresponds to the number of optical fiber elements so that they lead from the hollow space. Ferrule 4 provides another hollow space which stores covers of multiple-fiber ribbon 2 having optical fiber elements, and other through holes whose number corresponds to the number of optical fiber elements so that they lead from another hollow space.

The covers of the optical fiber elements are removed and the exposed optical fiber elements project from the hollow spaces. These exposed optical fiber elements are inserted into the corresponding through holes, and fastened there. Ferrule 3, whose inner end has ends of the optical fiber elements at the inner end thereof after being passed through the through holes, is scrubbed and polished at its inner end together with the ends of the exposed optical fiber elements so that movable ferrule assembly 6 can be built. Ferrule 4, whose inner end has ends of the optical fiber elements at the inner end thereof after being passed through the through holes is scrubbed and polished at its inner end together with the ends of the exposed optical fiber elements so that fixed ferrule assembly 5 can be built.

The inner end of movable ferrule assembly 6, which faces the inner end of fixed ferrule assembly 5, is inclined by eight to 12 degrees with respect to a plane perpendicular to the optical axis of the variable light attenuator. The inner end of fixed ferrule assembly 5, which faces the inner end of movable ferrule assembly 6, is inclined by eight to 12 degrees with respect to a plane perpendicular to the optical axis of the variable light attenuator. The inclination is to reduce the optical power loss at the interface between the ends of the movable and fixed ferrule assemblies due to optical reflection at the interface.

Fixed ferrule assembly 5 is provided with a pair of setscrew holes 7.

Substrate 24 has a groove 16 with a cross-section having a U shape. The bottom of groove 16 touches the bottoms (used as references) of ferrule assemblies 5 and 6, and movable ferrule assembly 6 slides along the bottom of groove 16.

Substrate 24 is provided with four setscrew holes 10 for fastening cover 13 on the top thereof, a pair of spot facing holes 11 which fasten the fixed ferrule assembly at the bottom thereof, and a pair of setscrew holes 12 which fasten the leaf spring 21 to the substrate.

Substrate 24 is also provided with a spot facing hole 8 which stores coil spring 17 in the front sidewall thereof, and through hole 9 which guides a micrometer spindle 18 through the rear side wall thereof.

Cover 13, which is mounted on substrate 24, is provided with four spot facing holes 14 which fasten substrate 24 thereto, and spot facing hole 15 which stores coil spring 23.

The assembly is fabricated in the following manner:

Fixed ferrule assembly 5 is first fastened to substrate 24 at the bottom thereof by means of setscrews 22.

Coil spring 17 is next inserted into spot facing hole 8. Movable ferrule assembly 6 is then placed at the bottom of groove 16 on substrate 24 so that the movable ferrule assembly 6 can be positioned facing fixed ferrule assembly 5.

Leaf spring 21 which pushes movable ferrule assembly 6 toward fixed ferrule assembly 5 is fastened to the left side of substrate 24, where movable ferrule assembly 6 is set, by means of setscrews 34. Leaf spring 21 thereby causes the ends of the optical fiber elements of movable ferrule assembly 6 to closely contact the ends of the optical fiber elements of fixed ferrule assembly 5.

Coil spring 23 is thereafter inserted into spot facing hole 15 of cover 13, and cover 13 is fastened to substrate 24 by means of setscrews 19.

Micrometer spindle 18 is inserted into through hole 9 and its adjusting means is fastened to another substrate (not shown) which is assembled together with substrate 24.

Movable ferrule assembly 6 is in this state pressed toward the bottom of groove 16 of substrate 24 by means of coil spring 23.

Assume that both movable ferrule assembly 6 and fixed ferrule assembly 5 contact rear sidewall 20 of substrate 24 wherein micrometer spindle 18 has been inserted. At that time, the dimensions of the components used to build the variable light attenuator are determined so that the offset between the centers of the optical fiber element cores in movable and fixed ferrule assemblies 6 and 5 becomes zero. Under such conditions as described above, the optical power attenuation at the interface between movable and fixed ferrule assemblies 6 and 5 becomes zero.

Figure 4:
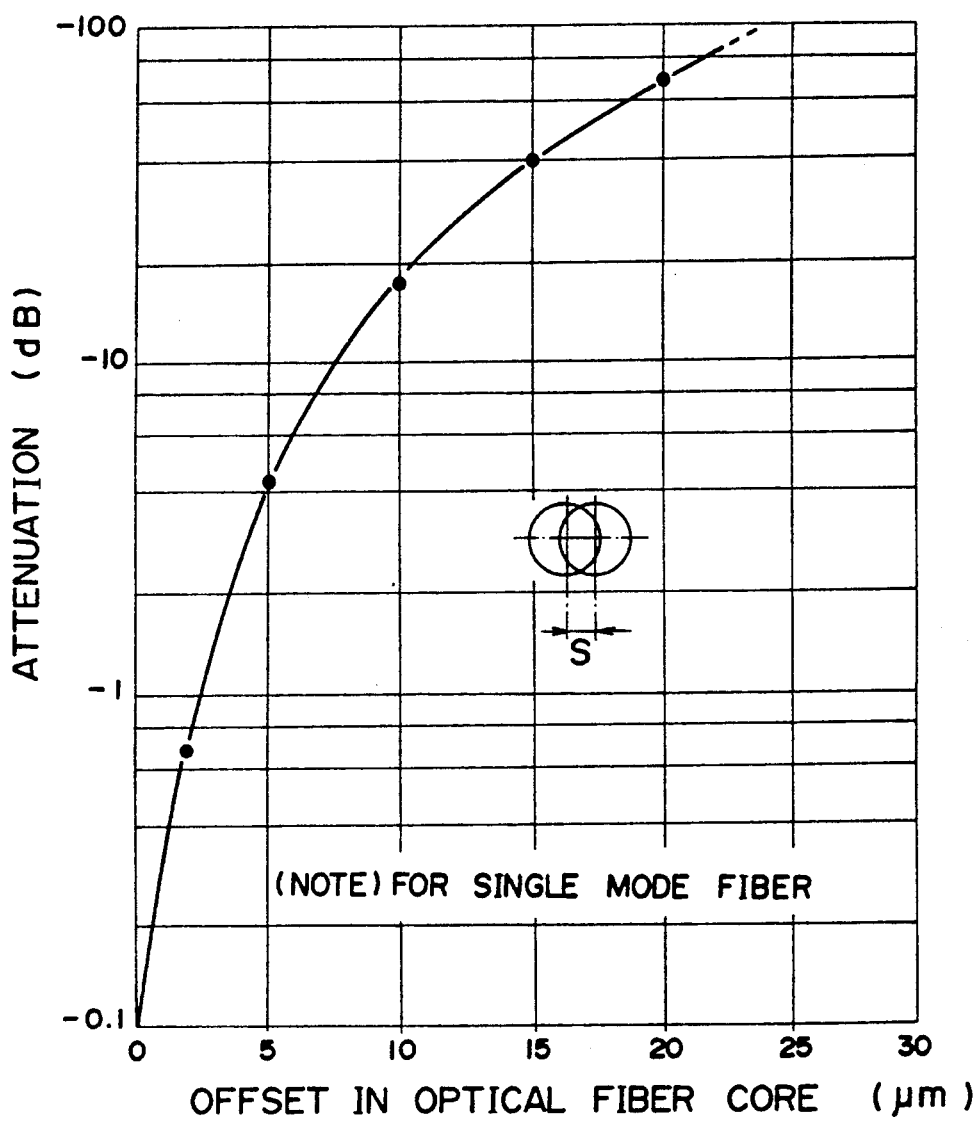
FIG. 4 is a graph showing the attenuation of light in terms of the offset of the centers of the optical fiber element cores.
Figure 5:
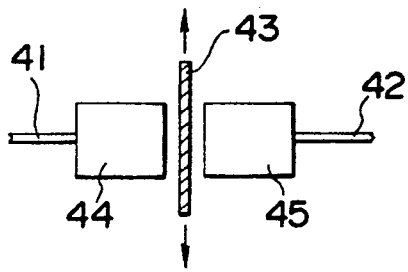
FIG. 5 is a conventional variable light attenuator, for attenuating the light power transmitted through an optical fiber.
Figure 6:
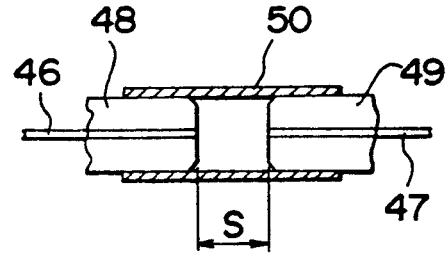
FIG. 6 is a cross-sectional view of another conventional variable light attenuator.
Figure 7:
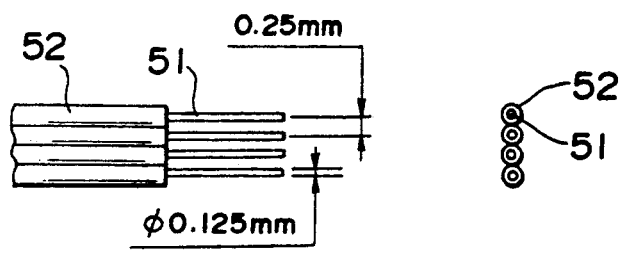
FIG. 7 shows the structure of the single-mode multiple-fiber ribbon consisting of a plurality of optical fibers.

FIG. 4 is a graph showing the optical power attenuation in terms of the offset between the centers of the optical fiber element cores in the movable and fixed ferrule assemblies.

This embodiment assumes that the maximum attenuation of the optical power is specified as −40 dB. The maximum quantity of offset in FIG. 4 measures 15 μm.

The gap between movable ferrule assembly 6 and the front sidewall of substrate 24 adjacent the side of coil spring 8 is specified as 0.125 mm.

If one turns micrometer spindle 18 clockwise to push coil spring 17 toward the top end of spot spacing hole 8, movable ferrule assembly 6 is offset from fixed ferrule assembly 5 by an amount within 0.125 mm due to a shift toward the direction perpendicular to the axis of the optical fiber elements. This offset causes the variable light attenuator to precisely control the optical power attenuation.

Assume that each optical fiber element has a diameter of 0.125 mm. If one shifts movable ferrule assembly 6 by a factor of 0.125 mm, the common area shared by movable ferrule assembly 6 and fixed ferrule assembly 5 becomes zero and the optical power which can pass through both ferrule assemblies is reduced.

In this mode of operation, the variable light attenuator can be used as a switch.

Figure 2:
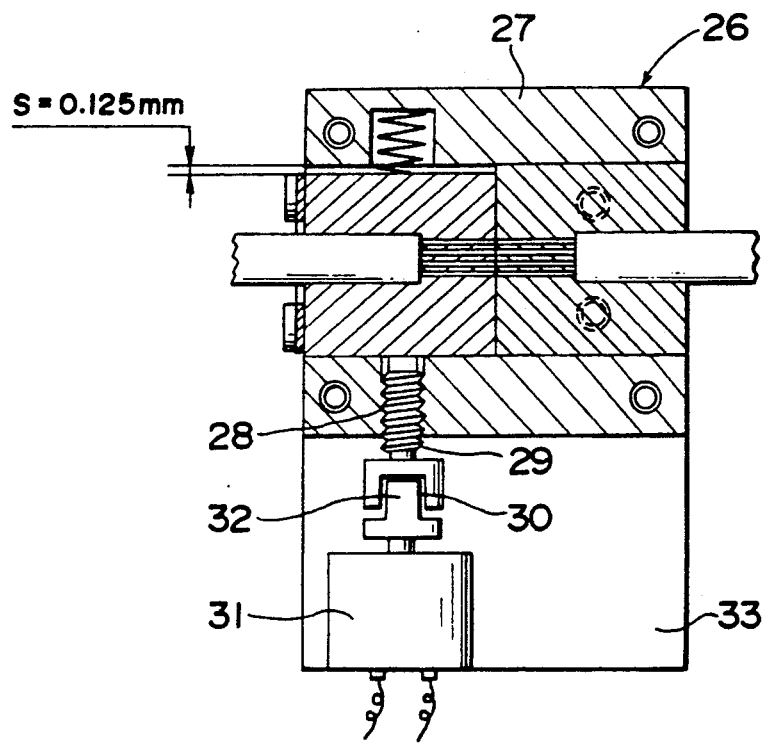
FIG. 2 is a sectional top plan view of a second embodiment of the variable light attenuator in accordance with the present invention.

FIG. 2 shows a sectional top plan view of a second embodiment of the variable light attenuator built in accordance with the present invention.

In FIG. 2, a screw rod 29 is used in place of the micrometer spindle of FIGS. 1(a), 1(b) and 1(c), as a sliding means to shift the movable ferrule assembly.

Screw rod 29 mates with a screw hole 28 of a sidewall 27 of a substrate 26.

Screw rod 29 leads to a dog coupler with a hollow space 30.

A miniature motor 31 is installed in a substrate 33, and a cap 32 is provided at the top of the shaft of the miniature motor 31 so that the motor shaft mates with the hollow space 30.

The gap between the movable ferrule assembly and sidewalls 27 of substrate 26 on both sides is specified as a total of 0.125 mm. If miniature motor 31 starts revolving clockwise to cause cap 32 to push the movable ferrule assembly toward the substrate 26, the movable ferrule assembly touches the sidewall of substrate 26, and then the optical path along the optical fiber elements is reduced in a short time.

The movable ferrule assembly is reset to the original position by revolving miniature motor 31 counterclockwise while a DC current is flowing through the motor in the reverse direction.

Assume that screw rod 29 has a pitch of 0.5 mm, and then the angle of revolution required to turn off the switch in the reverse direction measures 180 degrees.

An electric drive circuit to switch the optical circuit consisting of a movable ferrule assembly and a fixed ferrule assembly, which is not shown, has the function of operating miniature motor 31 in a short period of time.

The movable ferrule assembly is held fixed at the extreme end of the shifting stroke by means of screw rod 29 when screw rod 29 pushes the coil spring in the sidewall 27 of substrate 26. No DC current flows through the holding means unlike the conventional solenoid coil with a movable iron core, which requires a DC current to hold it in the conduction state.

Figure 3:
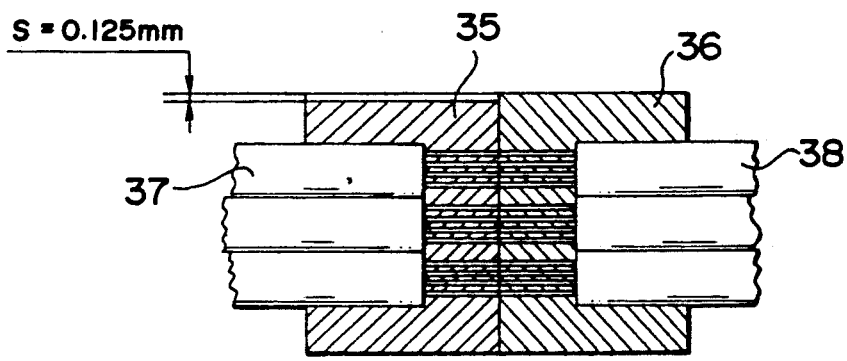
FIG. 3 is a sectional top plan view of a third embodiment of the variable light attenuator according to the present invention, wherein three multiple-fiber ribbons are installed in each ferrule assembly.

FIG. 3 is a sectional top plan view of a third embodiment of the variable light attenuator consisting of a pair of ferrule assemblies wherein optical fiber elements constituting a number of multiple-fiber ribbons are installed. The substrate and sliding means are omitted from FIG. 3. Three multiple-fiber ribbons 37 having optical fiber elements are arranged in parallel on ferrule assembly 35. Three multiple-fiber ribbons 38 having optical fiber elements also are arranged in parallel on ferrule assembly 36.

A variable light attenuator having multiple-fiber ribbons consisting of optical fiber elements, which is built in accordance with the present invention, consists of a movable ferrule assembly and a fixed ferrule assembly. Each ferrule assembly has one or more multiple-fiber ribbons consisting of optical fiber elements installed therein, at the bottom of a substrate of a U shape, so that the ends of the optical fiber elements installed in the movable ferrule assembly contact the ends of optical fiber elements installed in the fixed ferrule assembly. The movable ferrule assembly is shifted by sliding means installed in the sidewalls of the substrate so that the common area shared by the optical fiber elements mounted on the movable and fixed ferrule assemblies can continuously be changed in accordance with the shift of the movable ferrule assembly. The optical power passing through the optical fiber elements constituting one or more multiple-fiber ribbons can be reduced or cut without any crosstalk from one optical fiber element to an adjacent element.

Since the optical power can be reduced while each optical fiber element in the movable ferrule assembly is contacting the corresponding optical fiber element in the fixed ferrule assembly, a variable light attenuator of this type has mechanical stability against shock and vibration. In addition, no dew can occur at the interface between the optical fiber elements in the movable and fixed ferrule assemblies, even if the dew point changes due to humidity and/or temperature changes, unlike the conventional variable light attenuator. Excellent performance is expected in view of this dew free structure.

Assume that the ends of the optical fiber elements in each ferrule assembly are inclined by eight to 12 degrees with respect to a plane perpendicular to the optical axis of the optical fiber elements after they have been finished by scrubbing. The optical power reflected from the interface between the movable and fixed ferrule assemblies can enter into the clad layers surrounding the cores of the optical fiber elements. For instance, the optical power loss due to reflection at the interface between movable and fixed ferrule assemblies is as low as $-60$ dB or less for light at a wavelength of 1300 nm emitted from a laser diode. This type of variable light attenuator can thus be used in the future for large capacity optical communications.

Assume next that the variable light attenuator of this type is used as switching means. The screw rod locks the sliding means of the movable ferrule assembly without any electric force unlike the conventional solenoid coil with a movable iron core through which a DC current is flowing continuously. When a DC current flows through the miniature motor, within a short period of time the optical circuit consisting of multiple-fiber ribbons of optical fiber elements can be cut or conducting. The movable ferrule assembly is held fixed by the torque force which is generated by revolving the screw rod. The aging effect is expected to be greatly reduced by the above mentioned structure.

If two or more multiple-fiber ribbons are installed in each ferrule assembly, the optical power passing through these multiple-fiber ribbons can concurrently be reduced or cut.

Assume that a pair of multiple-fiber ribbons of optical fibers are installed in the fixed ferrule assembly, and that a multiple-fiber ribbon of optical fibers is installed in the movable ferrule assembly. The switching function of connecting "A" to "B" or "A" to "C" can be actualized in accordance with the structure mentioned above, provided that the shift of the movable ferrule assembly is much larger than the width of the multiple-fiber ribbon.

Figure 8:
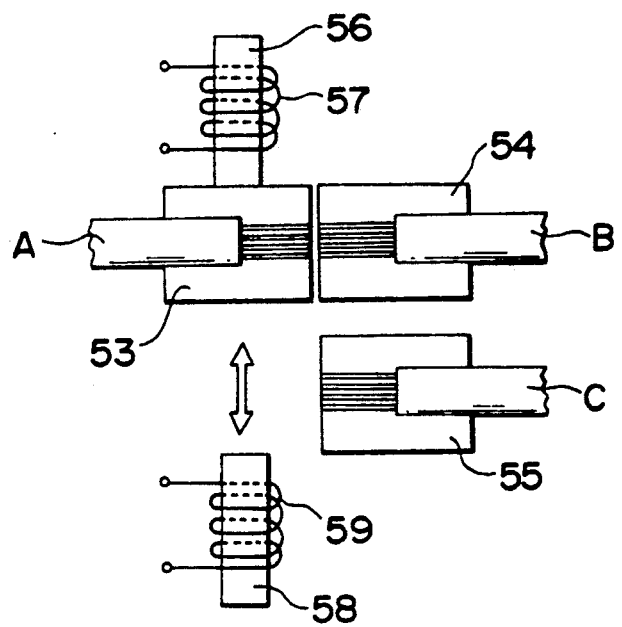
FIG. 8 shows the structure of an example of an optical switch for a multiple-fiber ribbon made of optical fibers which was originally presented by the inventor of the present invention, and is not known prior art.

This switching function is the same as that of FIG. 8.

What is claimed is:

1. A variable light attenuator for use with multiple-fiber ribbons consisting of optical fiber elements; consisting of first and second ferrule assemblies, each of which is fabricated by inserting a plurality of optical fiber elements, constituting one or more multiple-fiber ribbons, in each ribbon the plurality of optical fiber elements are arranged in a line with equal pitch, into a plurality of through holes arranged in a line with equal pitch in a rectangular block on a substrate, and by polishing the end of the substrate of optical fiber elements which appear in the end of the block on the substrate passing through the plurality of through holes, the ends of the optical fiber elements installed in each of the movable and fixed ferrule assemblies being finished to eight degrees or more inclined with respect to a plane perpendicular to the optical axis of the optical fibers; wherein:

the first ferrule assembly is fastened, as a fixed ferrule assembly, to the bottom of the substrate whose cross-section is of a U shape with reference to a plane which includes a line running along the plurality of optical fiber elements constituting a multiple-fiber ribbon, and the second ferrule assembly is installed, as a movable ferrule assembly, in the substrate so that the ends of the plurality of optical fiber elements which pass through the plurality of through holes therein face with the ends of the plurality of optical fiber elements installed in the fixed ferrule assembly, whereby the movable ferrule assembly can continuously be shifted along the ends of the optical fiber elements of the fixed ferrule assembly by means of sliding means installed in a sidewall of the substrate.

2. A variable light attenuator as claimed in claim 1, wherein the sliding means is a micrometer spindle which causes the movable ferrule assembly to shift toward the sidewall in the other side of the substrate while a coil spring in the sidewall pushes the movable ferrule assembly toward the sidewall in this side of the substrate, and wherein the common area shared by the optical fiber elements of the movable and fixed ferrule assemblies is set at the maximum which corresponds to 100% of the optical power which can pass through the movable and fixed ferrule assemblies unless the micrometer spindle is extruded from the sidewall in this side of the substrate, and whereby the common area can arbitrarily be reduced continously from 100% to 0%.

3. A variable light attenuator as claimed in claim 1, wherein the sliding means is an adjusting means, connected to a screw rod driven by a miniature motor installed in a sidewall in one side of the substrate, which cause the movable ferrule assembly to shift toward the sidewall in the other side of the substrate while a coil spring in the sidewall in the other side of the substrate pushes the movable ferrule assembly toward the sidewall in said one side of the substrate, wherein the common area shared by the optical fiber elements of the movable and fixed ferrule assemblies is set at a maximum which corresponds to full optical power which can pass through the movable and fixed ferrule assemblies unless the screw rod is extruded from the sidewall in said one side of the substrate, and that the common area is not provided when the optical powers passing through the movable and fixed ferrule assemblies are cut while the screw rod is extruded out of the sidewall with the miniature motor.

4. A variable light attenuator as claimed in claim 1, wherein the common area shared by the optical fiber elements of the movable and fixed ferrule assemblies can be set at an arbitrary value where the optical power attenuation is in the range 0% to 100% when the movable ferrule assembly runs on the plane of installation at the bottom of the substrate.

5. A variable light attenuator for attenuating light transmitted between first and second multiple-fiber ribbons, each of said multiple-fiber ribbons including a plurality of equally spaced optical fiber elements arranged in a straight line, said attenuator comprising
- a substrate having a U-shaped groove extending along a longitudinal axis thereof, said substrate further having spaced first and second sidewalls extending in a first direction perpendicular to said surface and parallel to said longitudinal axis;
- a fixed ferrule attached to said substrate within said U-shaped groove, said fixed ferrule having through holes therein extending in the direction of said longitudinal axis for receiving the optical fiber elements of said first multiple-fiber ribbon;
- a movable ferrule slidably positioned within said U-shaped groove, said movable ferrule having through holes therein extending in the direction of said longitudinal axis for receiving the optical fiber elements of said second multiple-fiber ribbon, the optical fiber elements of said first multiple-fiber ribbon being brought into close contact with corresponding optical fiber elements of said second multiple-fiber ribbon at an interface between said fixed and movable ferrules; and
- movable ferrule positioning means located within the sidewalls of said substrate for moving said movable ferrule with respect to said fixed ferrule in a second direction perpendicular to said longitudinal axis and said first direction, whereby the contact area of each of the optical fiber elements of said first multiple-fiber ribbon with a corresponding optical fiber element of said second multiple-fiber ribbon is varied to precisely control the attenuation of light transmitted between the optical fiber elements of said first and second multiple-fiber ribbons.

6. A variable light attenuator as claimed in claim 5 wherein said movable ferrule positioning means comprises
- resilient means positioned in the first sidewall of said substrate; and
- a micrometer having a spindle positioned opposite said resilient means in the second sidewall of said substrate in contact with said movable ferrule, rotation of the spindle of said micrometer moving said movable ferrule in said second direction.

7. A variable light attenuator as claimed in claim 6 wherein said resilient means is a coil spring.

8. A variable light attenuator as claimed in claim 6 wherein the clearance between said movable ferrule and the second sidewall of said substrate is approximately 0.125 mm.

9. A variable light attenuator as claimed in claim 5 wherein the interface between said fixed and movable ferrules is inclined at an angle in the range 8° to 12° with respect to a plane perpendicular to said longitudinal axis.

10. A variable light attenuator as claimed in claim 5 wherein said movable ferrule positioning means comprises
- resilient means positioned in the first sidewall of said substrate; and
- motor means having a screw rod positioned opposite said resilient means in the second sidewall of said substrate in contact with said movable ferrule, rotation of the screw rod by said motor moving said movable ferrule in said second direction.

11. A variable light attenuator as claimed in claim 5 wherein second resilient means is secured to said substrate, said second resilient means urging said movable ferrule in the direction of said longitudinal axis toward said fixed substrate.

12. A variable light attenuator as claimed in claim 10 wherein said second resilient means is a leaf spring.

* * * * *